United States Patent
Nagase (10) Patent No.: US 10,916,808 B2
(45) Date of Patent: Feb. 9, 2021

(54) SULFIDE SOLID-STATE BATTERY AND SULFIDE SOLID-STATE BATTERY SYSTEM PROVIDED WITH SAME

(71) Applicant: TOYOTA JIDOSHA KABUSHIKI KAISHA, Toyota (JP)

(72) Inventor: Hiroshi Nagase, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 16/396,091

(22) Filed: Apr. 26, 2019

(65) Prior Publication Data

US 2019/0334209 A1    Oct. 31, 2019

(30) Foreign Application Priority Data

Apr. 27, 2018 (JP) ................................. 2018-087073

(51) Int. Cl.
| | | |
|---|---|---|
| *H01M 10/0585* | (2010.01) | |
| *H01M 10/0562* | (2010.01) | |
| *H01M 4/66* | (2006.01) | |
| *H01M 10/42* | (2006.01) | |
| *H01M 10/48* | (2006.01) | |

(52) U.S. Cl.
CPC ....... *H01M 10/0585* (2013.01); *H01M 4/661* (2013.01); *H01M 10/0562* (2013.01); *H01M 10/425* (2013.01); *H01M 10/48* (2013.01); *H01M 2010/4271* (2013.01); *H01M 2300/0068* (2013.01)

(58) Field of Classification Search
None
See application file for complete search history.

(56) References Cited

U.S. PATENT DOCUMENTS

| | | | | |
|---|---|---|---|---|
| 8,679,677 | B1* | 3/2014 | Tamaki | H01M 10/0585 429/209 |
| 2008/0081257 | A1* | 4/2008 | Yoshida | H01M 10/0585 429/209 |
| 2008/0102363 | A1* | 5/2008 | Uemura | H01M 10/052 429/162 |
| 2013/0266859 | A1* | 10/2013 | Todoriki | H01M 4/624 429/211 |
| 2019/0126770 | A1* | 5/2019 | Koch | H01M 10/0445 |

FOREIGN PATENT DOCUMENTS

| | | |
|---|---|---|
| JP | 2016-157608 A | 9/2016 |
| JP | 2017-054720 A | 3/2017 |

* cited by examiner

*Primary Examiner* — Scott J. Chmielecki
(74) *Attorney, Agent, or Firm* — Sughrue Mion, PLLC (57) ABSTRACT

One aspect of the present invention provides a sulfide solid-state battery provided with: a negative electrode collector containing copper; a negative electrode mix layer disposed on the negative electrode collector, and containing a negative electrode active material; a positive electrode mix layer containing a positive electrode active material; a sulfide solid electrolyte layer sandwiched between the negative electrode mix layer and the positive electrode mix layer, and having a protruding portion that protrudes from a peripheral edge of the negative electrode mix layer and extends up to the negative electrode collector; and a reference electrode disposed in the protruding portion.

4 Claims, 3 Drawing Sheets

SULFIDE SOLID-STATE BATTERY AND SULFIDE SOLID-STATE BATTERY SYSTEM PROVIDED WITH SAME

CROSS REFERENCE TO RELATED APPLICATION

This application claims the benefit of priority to Japanese Patent Application No. 2018-087073 filed on Apr. 27, 2018. The entire contents of this application are hereby incorporated herein by reference.

BACKGROUND OF THE DISCLOSURE

1. Field

The present invention relates to a sulfide solid-state battery and a sulfide solid-state battery system provided with the same.

2. Background

The development of all-solid-state batteries having solid electrolyte layers has accelerated in recent years to meet the demands in terms of, for instance, improving the reliability and reducing the cost of secondary batteries (see Japanese Patent Application Publication Nos. 2017-054720 and 2016-157608). For example, Japanese Patent Application Publication No. 2017-054720 discloses an all-solid-state battery provided with a positive electrode, a negative electrode, and a sulfide solid electrolyte layer interposed between the positive electrode and the negative electrode. In the all-solid-state battery of Japanese Patent Application Publication No. 2017-054720, the negative electrode has a copper foil, and a negative electrode mix layer disposed on the copper foil and containing a negative electrode active material and a sulfide solid electrolyte.

SUMMARY

Findings by the inventors reveal that in an all-solid-state battery having such a configuration Cu may leach from the copper foil and diffuse up to the sulfide solid electrolyte layer, for instance when the battery is exposed to a high-temperature environment or when the battery is in an over-discharged state and the potential of the negative electrode is high. In consequence, Cu and the constituent component of the sulfide solid electrolyte layer may react, giving rise to conductive compounds having electron conductivity. For instance, CuS may be generated as a result of reactions between Cu and S in the sulfide solid electrolyte layer. Leakage currents may occur thereby, which leads to a drop in the capacity of the all-solid-state battery, and in turn, to short-circuits between the positive electrode and the negative electrode. A need has therefore arisen for detecting as early as possible the generation of conductive compounds in a sulfide solid electrolyte layer.

It is an object of the present invention, arrived at in the light of the above considerations, to provide a sulfide solid-state battery that enables early detection of generation of conductive compounds in a sulfide solid electrolyte layer. A related object is to provide a sulfide solid-state battery system provided with that sulfide solid-state battery.

In one aspect, the present invention provides a sulfide solid-state battery that has: a negative electrode collector containing copper; a negative electrode mix layer disposed on the negative electrode collector, and containing a negative electrode active material; a positive electrode mix layer containing a positive electrode active material; a sulfide solid electrolyte layer sandwiched between the negative electrode mix layer and the positive electrode mix layer, and having a protruding portion that protrudes from a peripheral edge of the negative electrode mix layer and extends up to the negative electrode collector; and a reference electrode disposed in the protruding portion.

The sulfide solid-state battery is configured to allow measuring voltage across the reference electrode and the negative electrode collector. The protruding portion of the sulfide solid electrolyte layer exhibits electron conductivity when Cu leaches from the negative electrode collector and a conductive compound (for instance CuS) is generated. The voltage across the reference electrode and the negative electrode collector drops as a result. Generation of a conductive compound can be grasped at an early stage in the above sulfide solid-state battery through measurement of changes in the above voltage. As a result, it becomes possible for instance to address drops in the capacity of the sulfide solid-state battery, for instance by replacing the battery by a new one, before the drop in capacity progresses any further.

In one aspect, when an average thickness of the negative electrode mix layer in a stacking direction of the positive electrode mix layer and the negative electrode mix layer is 100%, the reference electrode is disposed in the protruding portion within a length range up to 50% of the average thickness of the negative electrode mix layer from a surface of the negative electrode collector. As a result, it becomes possible for instance to detect, at an earlier stage, generation of a predetermined or greater amount of a conductive compound.

In one aspect, the reference electrode is fixed to a surface of the negative electrode collector while insulated from the negative electrode collector. As a result, this allows producing the sulfide solid-state battery disclosed herein efficiently, and allows for instance raising productivity and/or reducing costs.

In another aspect, the present invention provides a sulfide solid-state battery system having: the above sulfide solid-state battery; a voltage sensor electrically connected to the reference electrode and the negative electrode collector, and measuring voltage across the reference electrode and the negative electrode collector; and a detection unit electrically connected to the voltage sensor, wherein the detection unit includes a measurement unit that measures voltage by controlling the voltage sensor. As a result, it becomes possible to perform a voltage measurement operation automatically. In consequence, this allows a user to conveniently grasp the state of the sulfide solid-state battery, for instance without engaging a technician.

In one aspect, the detection unit further includes: a storage unit that stores a threshold value set beforehand; a determination unit that compares a voltage value measured by the voltage sensor and the threshold value stored in the storage unit, and determines whether or not the voltage value has reached the threshold value; and a notification unit which notifies that the determination unit has determined that the voltage value has reached the threshold value. For instance, generation of a predetermined or greater amount of a conductive compound can be easily grasped as a result by a user.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Several embodiments of the sulfide solid-state battery and the sulfide solid-state battery system disclosed herein in will be explained below with reference to accompanying drawings. Needless to say, the embodiments explained herein are not meant to limit the present invention in any particular way. Any features (for example, further battery constituent elements and ordinary production processes of batteries, not being characterizing features of the present invention) other than the matter specifically set forth in the present specification and that may be necessary for carrying out the present invention can be regarded as design matter for a person skilled in the art based on conventional art in the relevant technical field. The sulfide solid-state battery and sulfide solid-state battery system disclosed herein can be realized on the basis of the disclosure of the present specification and common technical knowledge in the relevant technical field. In the present specification a numerical value range notated as "A to B" (where A and B are arbitrary numerical values) denotes a value equal to or larger than A and equal to or smaller than B.

In the drawings below, members and portions that elicit identical effects are denoted with identical reference numerals, and a recurrent explanation thereof may be omitted or simplified. The reference symbol X in the drawings denotes a stacking direction of a positive electrode mix layer and a negative electrode mix layer. The reference symbol Y in the figures denotes a width direction of the positive electrode mix layer and the negative electrode mix layer, perpendicular to the stacking direction X. The reference symbols U, D, L and R in the drawings denote up, down, left and right, respectively. However, these are merely directions for convenience of explanation, and the manner in which the sulfide solid-state battery and the sulfide solid-state battery system are disposed is not limited in any way.

Figure 1:
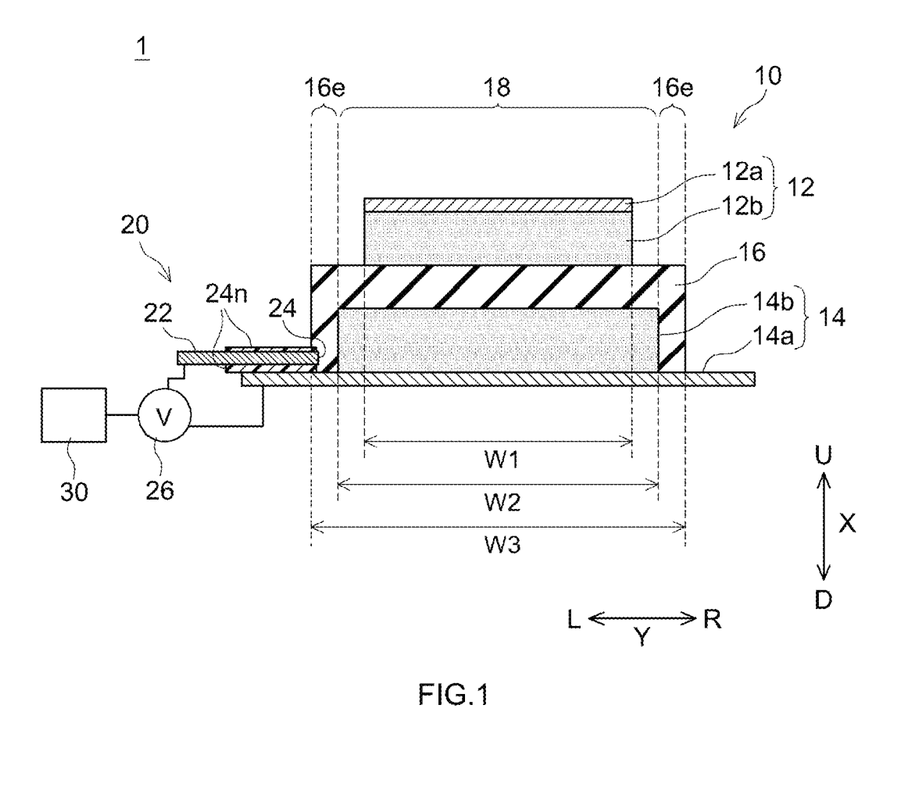
FIG. 1 is a cross-sectional diagram illustrating schematically a sulfide solid-state battery system according to an embodiment.

FIG. 1 is a cross-sectional diagram illustrating schematically a sulfide solid-state battery system 1 according to an embodiment. The sulfide solid-state battery system 1 of the present embodiment is provided with a sulfide solid-state battery 10, a voltage sensor 26 and a detection unit 30 of a conductive compound (hereafter also referred to as "detection unit 30"). The sulfide solid-state battery 10 is provided with a positive electrode 12, a negative electrode 14, a sulfide solid electrolyte layer 16 and a reference electrode 22. The reference electrode 22 and the voltage sensor 26 can be grasped as a detection mechanism 20 of a conductive compound. The various constituent elements will be explained in turn below.

The sulfide solid-state battery 10 is a power storage device capable of storing power. The sulfide solid-state battery 10 is typically a chargeable and dischargeable secondary battery, for instance a lithium ion secondary battery. The sulfide solid-state battery 10 is configured through physical integration of the positive electrode 12, the negative electrode 14, the sulfide solid electrolyte layer 16 and the reference electrode 22. The sulfide solid electrolyte layer 16 is disposed between the positive electrode 12 and the negative electrode 14, and insulates the positive electrode 12 and the negative electrode 14. The positive electrode 12 and the sulfide solid electrolyte layer 16 are interface-joined to each other. Similarly, the negative electrode 14 and the sulfide solid electrolyte layer 16 are interface-joined to each other. The sulfide solid electrolyte layer 16 is sandwiched between the positive electrode 12 and the negative electrode 14. In the present specification the term "joined" signifies having such cohesion that top and bottom do not come off each other when flipped upside down.

The positive electrode 12 is provided with a positive electrode collector 12a and a positive electrode mix layer 12b fixed to one surface of the positive electrode collector 12a. The positive electrode collector 12a is a conductive member. Although not depicted in the figures, the positive electrode collector 12a is electrically connected to a positive electrode terminal for external connection. Although not particularly limited thereto, the positive electrode collector 12a is typically made of a metal having good conductivity, for instance Al, Ti, Cr, Fe, Ni, Cu, Zn, Ag, Pt, Au or stainless steel (SUS). The positive electrode collector 12a may be for instance made of aluminum. In the present embodiment, the positive electrode 12 is made up of the positive electrode collector 12a, and the positive electrode mix layer 12b fixed to one surface of the positive electrode collector 12a, but the positive electrode 12 may lack the positive electrode collector 12a. The positive electrode mix layer 12b may be fixed to both surfaces of the positive electrode collector 12a.

The positive electrode mix layer 12b contains at least a positive electrode active material. The positive electrode active material is a material capable of reversibly storing and releasing charge carriers. Although not particularly limited thereto, examples of the positive electrode active material include for instance metal oxides containing one or two or more metal elements and oxygen. The metal oxide may be a compound containing lithium, one or two or more transition metal elements, and oxygen. Examples of metal oxides include lithium-transition metal complex oxides such as lithium-nickel-containing complex oxides, lithium-cobalt-containing complex oxides, lithium-nickel-cobalt-containing complex oxides, lithium-manganese-containing complex oxides and lithium-nickel-cobalt-manganese-containing complex oxides.

In addition to the positive electrode active material, the positive electrode mix layer 12b may contain as needed components other than the positive electrode active material, for instance a solid electrolyte material, a binder, a conductive material and various additives. Examples of the solid electrolyte material include inorganic solid electrolyte materials such as sulfide solid electrolyte materials, oxide solid electrolyte materials, nitride solid electrolyte materials and halide solid electrolyte materials. A more specific example is the sulfide solid electrolyte material described below. Examples of the binder include halogenated vinyl resins such as polyvinylidene fluoride (PVdF) and copolymers of polyvinylidene fluoride and hexafluoropropylene (PVdF-HFP). Examples of conductive materials include for instance carbon materials such as vapor-grown carbon fibers and carbon black.

The negative electrode 14 is provided with a negative electrode collector 14a and with a negative electrode mix layer 14b fixed to one surface of the negative electrode collector 14a. The negative electrode collector 14a is a conductive member. Although not depicted in the figures, the negative electrode collector 14a is electrically connected to a negative electrode terminal for external connection. In the present embodiment also the negative electrode collector 14a is electrically connected to the voltage sensor 26. The negative electrode collector 14a contains a copper (Cu) component. The negative electrode collector 14a may be made of a metal of good conductivity, such as Cu, and is for instance made of copper or of a copper alloy that contains copper. The negative electrode collector 14a may have for instance Ni, Cr or carbon plated or vapor-deposited on the surface of copper. The above-described problem of generation of a conductive compound is particularly likely to occur in a case where the content ratio of copper in the negative electrode collector 14a is high, for instance in a case where the Cu component is 50 mass % or higher, or further 80 mass % or higher, of the negative electrode collector 14a as a whole. Therefore, using the art disclosed herein elicits a yet more pronounced effect in a case where the content ratio of copper in the negative electrode collector 14a is high, for instance in a case where the negative electrode collector 14a is made of copper.

The negative electrode mix layer 14b contains at least a negative electrode active material. The negative electrode active material is a material capable of reversibly storing and releasing charge carriers. Although not particularly limited thereto, examples of the negative electrode active material include for instance carbon materials such as hard carbon and graphite, and metallic materials such as In, Al, Si and Sn. The negative electrode active material may be for instance a graphite-based carbon material having a proportion of graphite of about 50 mass % or higher, for instance 80 mass % or higher.

In addition to the negative electrode active material, the negative electrode mix layer 14b may contain as needed other components, for instance a solid electrolyte material, a binder, a conductive material and various additives. Examples of the solid electrolyte material include inorganic solid electrolyte materials such as sulfide solid electrolyte materials, oxide solid electrolyte materials, nitride solid electrolyte materials and halide solid electrolyte materials. A more specific example is the sulfide solid electrolyte material described below. Examples of the binder include halogenated vinyl resins such as polyvinylidene fluoride (PVdF) and copolymers of polyvinylidene fluoride and hexafluoropropylene (PVdF-HFP).

The sulfide solid electrolyte layer 16 contains at least a sulfide solid electrolyte material. Although not particularly limited thereto, examples of sulfide solid electrolyte materials include for instance $Li_2S$—$P_2S_5$-based materials such as $Li_2S$—$P_2S_5$, $Li_2S$—$P_2S_5$—LiI, $Li_2S$—$P_2S_5$—$Li_2O$ and LiI—$Li_2O$—$Li_2S$—$P_2S_5$. The sulfide solid electrolyte material may be glass (amorphous material), or crystallized glass, or a crystalline material. The sulfide solid electrolyte material has ion conductivity. For instance, the sulfide solid electrolyte material has Li ion conductivity, in a lithium ion secondary battery. The Li ionic conductivity of the sulfide solid electrolyte material at room temperature (25° C.) is for instance $1\times10^{-5}$ S/cm or higher, and may be $1\times10^{-4}$ S/cm or higher.

In addition to the sulfide solid electrolyte material, the sulfide solid electrolyte layer 16 may contain as needed other components, for instance a binder and various additives. Examples of the binder include halogenated vinyl resins such as polyvinylidene fluoride (PVdF) and copolymers of polyvinylidene fluoride and hexafluoropropylene (PVdF-HFP); and rubbers such as acrylate butadiene rubber (ABR), styrene butadiene rubber (SBR) and acrylonitrile butadiene copolymer rubber (NBR). The binder may be a diene rubber having double bonds in the main chain, for instance a butadiene-based rubber in which butadiene is 50 mol % or more of the whole.

In the present embodiment, the sulfide solid electrolyte layer 16 is disposed so as to protrude beyond the peripheral edge of the negative electrode mix layer 14b, and cover the entire surface of the negative electrode mix layer 14b. In other words, the sulfide solid electrolyte layer 16 has a C-shape that covers the surface (top surface in a stacking direction X) of the negative electrode mix layer 14b opposing the negative electrode collector 14a and side surfaces of the negative electrode mix layer 14b (left and right surfaces in a width direction Y). The sulfide solid electrolyte layer 16 need not cover the entirety of the negative electrode mix layer 14b. In a lateral view, for instance part of the side surface of the negative electrode mix layer 14b may be exposed. The sulfide solid electrolyte layer 16 is in contact with the negative electrode collector 14a. In other words, a region at which the negative electrode mix layer 14b is formed and a region at which the sulfide solid electrolyte layer 16 is formed are present on the negative electrode collector 14a.

A width W2 of the negative electrode mix layer 14b in the width direction Y is greater than a width W1 of the positive electrode mix layer 12b. A width W3 of the sulfide solid electrolyte layer 16 is greater than the width W2 of the negative electrode mix layer 14b. That is, W1, W2 and W3 satisfy W1<W2<W3. The area of the negative electrode mix layer 14b over the width W2, in the width direction Y, is a reaction portion 18 that can be involved in charging and discharge reactions of the positive electrode 12 and the negative electrode 14. In the reaction portion 18 the positive electrode mix layer 12b and the negative electrode mix layer 14b oppose each other in the stacking direction X while insulated by the interposed sulfide solid electrolyte layer 16.

The sulfide solid electrolyte layer 16 extends towards the left and right sides of the reaction portion 18 in the width direction Y, in such a way as to come into contact with the negative electrode mix layer 14b. In other words, the sulfide solid electrolyte layer 16 has a portion included in the reaction portion 18, and has protruding portions 16e, from the reaction portion 18, extending in a direction of approaching the negative electrode collector 14a along respective side surfaces of the negative electrode mix layer 14b. The protruding portions 16e are in contact with the negative electrode collector 14a. Generation of a conductive compound can be detected earlier as a result. In the present embodiment the protruding portions 16e are in contact with the side surfaces of the negative electrode mix layer 14b in the width direction Y. However, the sulfide solid electrolyte layer 16 need not be in contact with the negative electrode mix layer 14b in the width direction Y. The reference electrode 22 is disposed in a respective protruding portion 16e.

The reference electrode 22 is a conductive member that makes up part of a circuit for voltage measurement. The reference electrode 22 is an electrode serving as a reference for measuring the voltage of the negative electrode collector 14a. Although not particularly limited thereto, the reference electrode 22 may be made of a metal having good conductivity, such as Al, Ti, Cr, Fe, Ni, Cu, Zn, Ag, Pt, Au or stainless steel (SUS). Among the foregoing, the reference electrode 22 is preferably made up of Ag, Pt or Au having low ionization tendency and boasting high chemical stability. Although not particularly limited thereto, the reference electrode 22 has for instance a linear shape or an elongate plate shape.

In the present embodiment, the reference electrode 22 is linear and is disposed along the surface of the negative electrode collector 14a on the side at which the negative electrode mix layer 14b is formed. The reference electrode 22 is fixed to the surface of the negative electrode collector 14a, to be integral with the negative electrode collector 14a. The reference electrode 22 and the negative electrode collector 14a are insulated from each other. Specifically, the surface of part of the reference electrode 22 is covered by an insulating resin material 24n in order to prevent conduction with the negative electrode collector 14a. The insulating resin material 24n may be for instance a halogenated vinyl resin such as polyvinylidene fluoride (PVdF). A conductive portion 24 is exposed at an end (right-side end in the width direction Y) of the reference electrode 22. The reference electrode 22 is connected to a respective protruding portion 16e of the sulfide solid electrolyte layer 16 via the conductive portion 24. In the present embodiment there is one reference electrode 22. However, for instance two or more reference electrodes 22 can be disposed in one sulfide solid-state battery 10 at different positions with respect to the negative electrode collector 14a. As in the variation described below, the reference electrode 22 and the negative electrode collector 14a may be not integrated with each other.

In one aspect, the conductive portion 24 of the reference electrode 22 is disposed at a region close to the negative electrode collector 14a, in the protruding portion 16e. For instance, the conductive portion 24 of the reference electrode 22 may be disposed at a portion of closer to the negative electrode collector 14a than to the top surface of the negative electrode mix layer 14b (face of the side close to the positive electrode mix layer 12b). Herein the conductive portion 24 of the reference electrode 22 is disposed within a length range no greater than about 80%, typically no greater than 50%, further no greater than 30%, and for instance no greater than 20%, of the average thickness of the negative electrode mix layer 14b as a whole, from the surface of the negative electrode collector 14a, taking as 100% the average thickness (average value of length in the stacking direction X) of the negative electrode mix layer 14b as a whole. Generation of a conductive compound can be detected at an earlier stage as a result.

The sulfide solid-state battery 10 provided with the reference electrode 22 such as the one described in FIG. 1 can be produced in accordance with a production method having for instance the following steps: (step 1) step of coating the positive electrode collector 12a with a positive electrode slurry containing a positive electrode active material and a solvent, with drying, to thereby produce the positive electrode 12 provided with the positive electrode mix layer 12b on the positive electrode collector 12a; (step 2) step of coating the negative electrode collector 14a with a negative electrode slurry containing a negative electrode active material and a solvent, with drying, to thereby produce the negative electrode 14 provided with the negative electrode mix layer 14b on the negative electrode collector 14a; (step 3) a step of fixing the reference electrode 22 having the conductive portion 24 to the vicinity of the negative electrode mix layer 14b on the negative electrode collector 14a, in a state where the reference electrode 22 is insulated from the negative electrode collector 14a; (step 4) a step of coating the surface of the negative electrode collector 14a having the reference electrode 22 with a solid electrolyte slurry containing a solid electrolyte material, to a greater size than that of the negative electrode mix layer 14b, so as to cover the negative electrode mix layer 14b and the reference electrode 22, followed by drying, to thereby form the sulfide solid electrolyte layer 16 on the negative electrode collector 14a; (step 5) step of laying up the positive electrode 12 and the negative electrode 14 so as to sandwich the sulfide solid electrolyte layer 16 in between, and press-pressing the whole in the stacking direction. By arranging the reference electrode 22 on the negative electrode collector 14a in step 3 and forming the sulfide solid electrolyte layer 16 in step 4, the sulfide solid-state battery 10 can be produced more conveniently than for instance by forming the sulfide solid electrolyte layer 16 and thereafter inserting the reference electrode 22.

Conventionally known methods can be used as appropriate for application and drying of the slurry in steps 1, 2 and 4. The slurry can be applied for instance using a conventionally known coating device such as an applicator, a die coater, a slit coater or a screen coater. The slurry can be dried for instance using a drying apparatus such as a heat drying apparatus, a vacuum drying apparatus, or using dry air, with the involved operations of heating, pressure-reduction, blowing and so forth being carried out singly or in appropriate combinations. Heating may be carried out typically at 200° C. or below, for instance at a temperature in the range of 80° C. to 150° C. In step 3 the reference electrode 22 can be fixed to the negative electrode collector 14a using a conventionally known fixing member, for instance an adhesive tape, a pressure-sensitive adhesive tape or an adhesive agent. Press-pressing in step 5 can be accomplished for instance using a conventionally known press apparatus such as a roll press apparatus or a flat plate-press apparatus.

The voltage sensor 26 is electrically connected to the reference electrode 22 and the negative electrode collector 14a. The voltage sensor 26 is a measuring instrument that measures the voltage across the reference electrode 22 and the negative electrode collector 14a. The voltage sensor 26 is electrically connected to the detection unit 30 and is controlled by the detection unit 30. The voltage sensor 26 is not particularly limited, and a conventionally known voltage sensor can be used herein as appropriate. The number of voltage sensors 26 is typically identical to the number of reference electrodes 22, and is for instance one. The voltage measured by the voltage sensor 26 is fed to the detection unit 30.

The detection unit 30 is a control device that controls the voltage sensor 26. The detection unit 30 is typically a computer. The detection unit 30 is provided for instance with an electrical computing device such as a central processing unit (CPU), and with a storage device such as a memory. The detection unit 30 may be further provided with a display panel and/or acoustic device that notifies to a user (user of the sulfide solid-state battery 10; likewise hereafter) for instance a situation where a conductive compound has been generated. The detection unit 30 may have built thereinto a control unit (not shown) that controls the charging and discharge operations of the sulfide solid-state battery 10.

Figure 2:
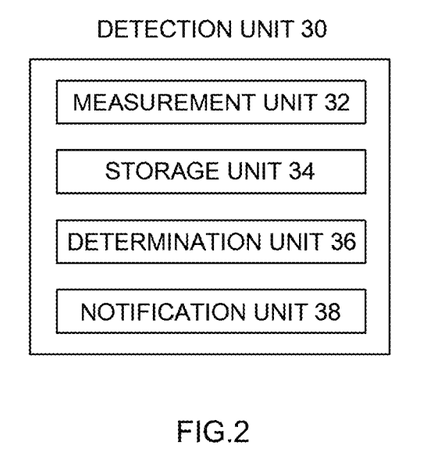
FIG. 2 is a block diagram illustrating the configuration of a detection unit according to the embodiment.

FIG. 2 is a block diagram illustrating the configuration of the detection unit 30. In the present embodiment, the detection unit 30 is provided with a measurement unit 32, a storage unit 34, a determination unit 36 and a notification unit 38. The units of the detection unit 30 are configured so as to be capable of communicating with each other. The units of the detection unit 30 may be implemented by a processor, or may be built into circuits.

The measurement unit 32 is communicatively connected to the voltage sensor 26. The measurement unit 32 is configured to switch between an "ON" state in which there is measured the voltage across the reference electrode 22 and the negative electrode collector 14a, and an "OFF" state in which there is not measured the voltage across the reference electrode 22 and the negative electrode collector 14a. The measurement unit 32 may be configured to measure continuously the voltage across the reference electrode 22 and the negative electrode collector 14a, or may be configured to measure the above voltage non-continuously, for instance periodically at predetermined time intervals. The measurement unit 32 may be configured for instance to switch automatically between the "ON" state of measuring voltage and the "OFF" state of not measuring voltage, in synchrony with the start and the end of the charging and discharge operations of the sulfide solid-state battery 10.

The storage unit 34 is for instance configured to store the voltage (initial voltage) across the reference electrode 22 and the negative electrode collector 14a in a preset initial state. For instance, the voltage value measured by the voltage sensor 26 at the time of shipping of the sulfide solid-state battery system 1, and one or two or more threshold values established beforehand for comparison, may be stored in the storage unit 34. For instance, there may be stored a first threshold value and a second threshold value of a level different from that of the first threshold value. For instance, an absolute value of voltage (for example 0 V) may be stored, in the storage unit 34, as a threshold value. For instance, a relative state determined by an attenuation rate with respect to the initial voltage, taken as a reference, may likewise be stored as a threshold value in the storage unit 34. As an example, a state of an attenuation rate of 50% from the initial voltage, with respect to 100% as the initial voltage, may be stored in the storage unit 34 as a first threshold value, and a state of 80% attenuation rate from the initial voltage may be stored as a second threshold value.

The determination unit 36 is communicatively connected to the voltage sensor 26. The voltage value measured by the voltage sensor 26 is inputted to the determination unit 36. The determination unit 36 is configured to determine the status of generation of a conductive compound on the basis of the measured voltage value. The determination unit 36 determines that a predetermined or greater amount of a conductive compound has been generated in the case for instance where the measured voltage value reaches a threshold value stored in the storage unit 34. For instance, it is determined that a predetermined or greater amount of a conductive compound has been generated in the case for example where the measured voltage reaches 0 V. Alternatively, for instance the determination unit 36 compares the measured voltage value with an initial voltage stored in the storage unit 34, and calculates the attenuation rate of voltage with respect to 100% as the initial voltage. A first state of low attenuation rate and a second state of higher attenuation rate of voltage than that of the first state are distinguished, to thereby determine the generation status of a conductive compound. As an example, an instance where the first threshold value is not reached (i.e. case the attenuation rate from an initial voltage is lower than 50%) may be determined to be a first state of little generation of a conductive compound, an instance where the first threshold value is reached but the second threshold value is not reached (i.e. a state in which the attenuation rate from the initial voltage lies in the range of 50% to less than 80%), may be determined to be a second state of slightly greater generation of a conductive compound, and an instance where the second threshold value is reached (i.e. where the attenuation rate from the initial voltage is 80% or higher) may be determined to be a third state of significant generation of a conductive compound.

The notification unit 38 is configured to notify, to the user, the determination result by the determination unit 36. The notification unit 38 may for instance be configured to notify, by way of a sound effect such as a warning sound (alarm), generation of a predetermined or greater amount of a conductive compound and/or the degree of generation of the conductive compound. The notification unit 38 may for instance be configured to display text/illustrations or the like on a display panel (not shown), notify stepwise generation of a predetermined or greater amount of a conductive compound and/or the degree of generation of the conductive compound. As a result, the user can grasp easily, while on-board, a status of generation of a conductive compound, for instance generation of a predetermined or greater amount of a conductive compound, and/or the degree of generation of the conductive compound. This allows therefore increasing convenience to the user.

Figure 3:
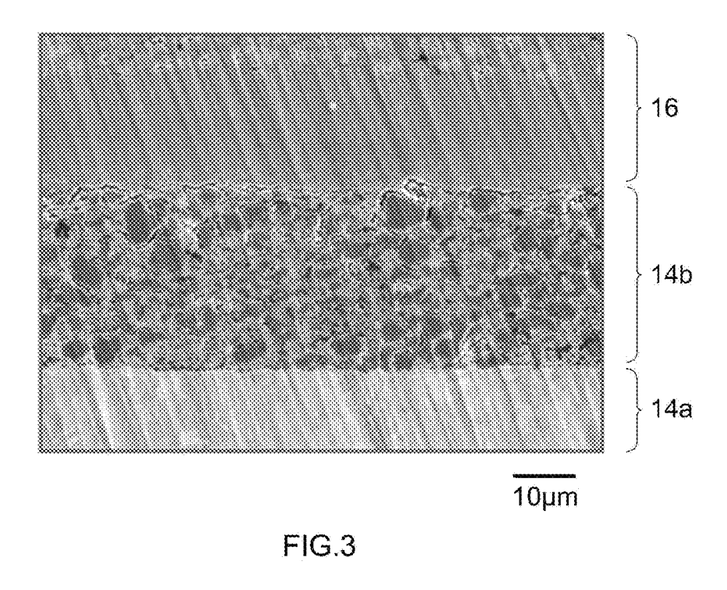
FIG. 3 is a SEM observation image of a cross section of a sulfide solid-state battery, on a negative electrode side.
Figure 4:
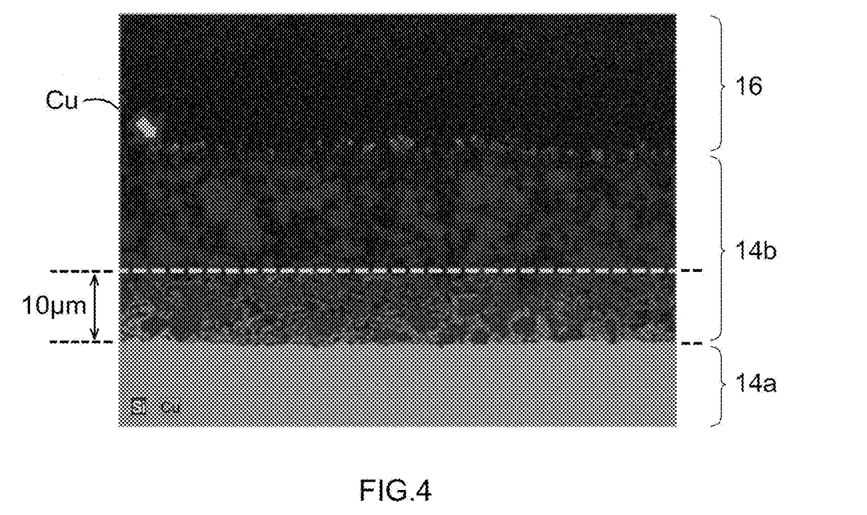
FIG. 4 is a mapping image of the SEM observation image of FIG. 3.

Generation of a conductive compound in the sulfide solid electrolyte layer 16 and/or the degree of generation of the conductive compound can thus be detected early in the sulfide solid-state battery system 1 provided with the sulfide solid-state battery 10. Specifically, the potential of the negative electrode collector 14a rises when the sulfide solid-state battery 10 is exposed to a high-temperature environment, for instance at 100° C. or above, or 150° C. or above, or when the sulfide solid-state battery 10 is in an over-discharged state. As an example, FIG. 3 illustrates a SEM observation image of a cross section, on the negative electrode 14 side, of the sulfide solid-state battery 10 exposed to a high-temperature environment, observed using a scanning electron microscope (SEM). FIG. 4 illustrates a mapping image resulting from mapping the SEM observation image of FIG. 3 to Si and Cu, by energy dispersive X-ray spectroscopy (EDS). In FIG. 4 the portion of high Cu concentration is represented in light color. As illustrated in FIGS. 3 and 4, when the potential of the negative electrode collector 14a increases and for instance exceeds the redox potential of Cu, Cu leaches from the negative electrode collector 14a and diffuses into the sulfide solid electrolyte layer 16. In particular, diffusion of Cu is pronounced within a thickness of 10 μm from the surface of the negative electrode collector 14a, and in the vicinity of the interface of the negative electrode mix layer 14b and the sulfide solid electrolyte layer 16. Thus, a compound having electron conductivity (for instance CuS) may become generated when the Cu component leached from the negative electrode collector 14a reacts with a constituent component (for instance S component) of the sulfide solid electrolyte layer 16.

The sulfide solid-state battery 10 disclosed herein, therefore, is provided with the reference electrode 22 in a respective protruding portion 16e of the sulfide solid electrolyte layer 16, and is configured to be capable of measuring voltage across the negative electrode collector 14a and the reference electrode 22. Further, the sulfide solid-state battery system 1 disclosed herein is configured to be capable of measuring automatically voltage across the negative electrode collector 14a and the reference electrode 22. Voltage across the negative electrode collector 14a and the reference electrode 22 drops when an electron-conductive compound is generated in the protruding portions 16e. In the sulfide solid-state battery 10 and the sulfide solid-state battery system 1, generation of a conductive compound can be grasped herein on the basis of a change (drop) in the voltage across the negative electrode collector 14a and the reference electrode 22. As a result, it becomes possible to detect generation of the conductive compound, in the sulfide solid-state battery 10 and the sulfide solid-state battery system 1, before a conductive compound is generated in the sulfide solid electrolyte layer 16 that makes up the reaction portion 18. Accordingly, degradation of the sulfide solid-state battery 10 caused by generation of a conductive compound can be thus predicted in advance in the sulfide solid-state battery 10 and the sulfide solid-state battery system 1. Therefore, for instance the sulfide solid-state battery 10 can be replaced by a new one, at an appropriate timing, before the occurrence a drop in battery performance (for instance, voltage drop) due to leakage current in the sulfide solid-state battery 10 becomes prominent, or before the sulfide solid-state battery 10 can no longer be charged or discharged.

The sulfide solid-state battery 10 disclosed herein and the sulfide solid-state battery system 1 provided with the sulfide solid-state battery 10 can be used for various applications. For instance, the battery and system can be used as a power source (drive power source) for motors installed in vehicles. The type of vehicle is not particularly limited, and typical examples include automobiles, plug-in hybrid vehicles (PHV), hybrid vehicles (HV) and electric vehicles (EV).

Various examples relating to the present invention will be explained below, but the invention is not meant to be limited to such concrete examples.

Example 1

Production of Positive Electrode

Firstly a lithium-transition metal complex oxide ($LiNi_{1/3}Mn_{1/3}Co_{1/3}O_2$ by Nichia Corporation) as a positive electrode active material and $LiI$—$Li_2O$—$Li_2S$—$P_2S_5$ as a sulfide solid electrolyte material were mixed at a mass ratio of positive electrode active material:sulfide solid electrolyte material=75:25, to prepare a mixed powder. Then, PVdF-HFP (product name "Solef (registered trademark) 21510" by Solvay) as a binder was weighed to 1.5 parts by mass with respect to 100 parts by mass as the positive electrode active material. Next, vapor-grown carbon fibers (by Showa Denko K. K.) as a conductive material were weighed to 3.0 parts by mass with respect to 100 parts by mass as the positive electrode active material. The mixed powder, the binder and the conductive material were mixed with n-butyl butyrate as a solvent, and the mixture kneaded for 1 minute in an ultrasonic homogenizer ("UH-50" by SMT Corporation), to thereby prepare a slurry-like composition for positive electrode formation (solids fraction 63%). The composition for positive electrode formation was applied to the surface of an aluminum foil (positive electrode collector) using an applicator (350 µm gap, by Taiyu Kizai Co., Ltd.), with 5 minutes of natural drying, followed by heat drying for 5 minutes at 100° C. Next, the aluminum foil and the composition for positive electrode formation were pressed in the stacking direction under conditions of linear pressure of 1 ton/cm, at 25° C., to prepare as a result a positive electrode in which a positive electrode mix layer was fixed to the positive electrode collector.

Production of Negative Electrode

Firstly graphite (product name "MF-6" by Mitsubishi Chemical Corporation) as a negative electrode active material and $LiI$—$Li_2O$—$Li_2S$—$P_2S_5$ as a sulfide solid electrolyte material were mixed to a mass ratio of negative electrode active material:sulfide solid electrolyte material=58:42, to prepare a mixed powder. Next, there was prepared a solution of n-butyl butyrate having a concentration of 5 mass % of a PVdF-based polymer (product name "KF polymer" by Kureha Corporation) as a binder. The mixed powder, the binder and the conductive material were mixed with n-butyl butyrate as a solvent, and the mixture was kneaded for 1 minute in an ultrasonic homogenizer ("UH-50" by SMT Corporation), to thereby prepare a slurry-like composition for negative electrode formation (solids fraction 63%). The PVdF-based polymer was mixed to 1.5 mass % with respect to the total of the composition for negative electrode formation. This composition for negative electrode formation was applied to the surface of a copper foil (negative electrode collector) using an applicator (350 µm gap, by Taiyu Kizai Co., Ltd.), with 5 minutes of natural drying, followed by heat drying for 5 minutes at 100° C. Next, the copper foil and the composition for negative electrode formation were pressed in the stacking direction under conditions of linear pressure of 1 ton/cm, at 25° C., to prepare as a result a negative electrode in which a negative electrode mix layer was fixed to the negative electrode collector.

Arrangement of Reference Electrode

Firstly a linear Au wire (φ50 µm) was prepared. Next, a solution of N-methyl-2-pyrrolidone (NMP) containing PVdF was prepared, and the Au wire was immersed in the solution, followed by drying. The surface of the Au wire became coated as a result with PVdF. Part of the insulating coat was stripped, to thereby expose the tip of the Au wire. A reference electrode provided with a conductive part at the tip was produced thereby. This reference electrode was disposed so that the conductive part came at a position 0.5 mm to the side of the negative electrode mix layer formed on the negative electrode collector, and was fixed to the negative electrode collector using adhesive tape.

Formation of Sulfide Solid Electrolyte Layer

Next, $Li_2S$—$P_2S_5$—$Li_2O$—$LiI$ as a sulfide solid electrolyte material and ABR-based rubber (5 mass % concentration) were mixed in an inert gas atmosphere. Heptane as a solvent was further mixed thereinto, with kneading in an ultrasonic homogenizer ("UH-50" by SMT Corporation), to thereby prepare a slurry-like composition for solid electrolyte formation (solids fraction 35%). The ABR-based rubber was mixed in to 1.5 mass % with respect to the total of the composition for solid electrolyte formation. The composition for solid electrolyte formation was applied to a negative electrode, so as to cover the negative electrode mix layer and the reference electrode, using an applicator (350 µm gap, by Taiyu Kizai Co., Ltd.), with natural drying for 5 minutes, followed by heat drying for 5 minutes at 100° C. As a result, a sulfide solid electrolyte layer became formed over the surface of the negative electrode collector and the surface of the negative electrode mix layer. A sulfide solid electrolyte layer was formed thus in which the reference electrode disposed on the negative electrode collector was connected to the sulfide solid electrolyte layer.

Construction of Sulfide Solid-state Battery

The positive electrode and the negative electrode with a sulfide solid electrolyte layer produced above were overlaid on each other so as to sandwich the sulfide solid electrolyte layer in between, and the whole was pressed at a pressure of 5 tons, to thereby construct a sulfide solid-state battery (Example 1) provided with a positive electrode, a negative electrode, a sulfide solid electrolyte layer and a reference electrode.

Comparative Example 1

Comparative example 1 is a test example in which the arrangement position of the reference electrode of Example 1 was modified. Specifically, Comparative example 1 is a test example in which a linear Au wire (φ50 μm) was used as it was, without an insulating coat, as a reference electrode disposed in the solid electrolyte layer between the positive electrode mix layer and the negative electrode mix layer, in the stacking direction. In concrete terms, the reference electrode was not arrayed on the negative electrode collector. The step of forming the sulfide solid electrolyte layer involved coating the negative electrode mix layer with the composition for solid electrolyte formation using an applicator (350 μm gap, by Taiyu Kizai Co., Ltd.), with natural drying for 5 minutes, followed by heat drying for 5 minutes at 100° C. Next, the tip of the Au wire was disposed in the composition for solid electrolyte formation positioned at the top the negative electrode mix layer, the composition for solid electrolyte formation was applied from above, and the whole was dried naturally and through heating. As a result, there was formed a sulfide solid electrolyte layer having a reference electrode disposed in a solid electrolyte layer positioned at the top of a negative electrode mix layer. A sulfide solid-state battery (Comparative example 1) was then constructed so that the reference electrode was sandwiched between the positive electrode and the negative electrode.

Evaluation of Cu Diffusibility

Voltage (first initial voltage) across the positive electrode and the negative electrode was measured in the sulfide solid-state batteries constructed above (Example 1 and Comparative example 1), in an environment at 25° C. Voltage (second initial voltage) across the reference electrode and the negative electrode collector was also measured. The result revealed that the first initial voltage of the two sulfide solid-state batteries was identical. The second initial voltage was about 1 V in both sulfide solid-state batteries. Next, each sulfide solid-state battery was held for 1 hour in a thermostatic bath at a temperature of 200° C., after which the voltage across the positive electrode and the negative electrode, and the voltage across the reference electrode and the negative electrode collector were measured once more.

The results revealed no change in voltage across the positive electrode and the negative electrode, with respect to the first initial voltage, in either of the sulfide solid-state batteries. In the sulfide solid-state battery of Comparative example 1 no change was observed in the voltage across the reference electrode and the negative electrode collector, with respect to the second initial voltage. By contrast, the voltage across the reference electrode and the negative electrode collector dropped significantly with respect to the second initial voltage, to substantially 0 V (short-circuit state), in the sulfide solid-state battery of Example 1. The underlying reason for this is deemed to be the generation of a conductive compound (for instance CuS) through leaching of Cu from the negative electrode collector, due to exposure of the sulfide solid-state battery to a high-temperature environment of 200° C. The above results indicated that by arranging the reference electrode on the side of the negative electrode mix layer, in the stacking direction of the positive electrode and the negative electrode, it becomes possible to detect generation of a conductive compound relatively earlier than in the case where the reference electrode is disposed between the positive electrode mix layer and the negative electrode mix layer. These results revealed the significance of the art disclosed herein.

The present invention has been thus explained in detail, but the above embodiments are merely illustrative in nature, and the invention disclosed herein encompasses several variations and modifications of the above-described concrete examples.

Figure 5:
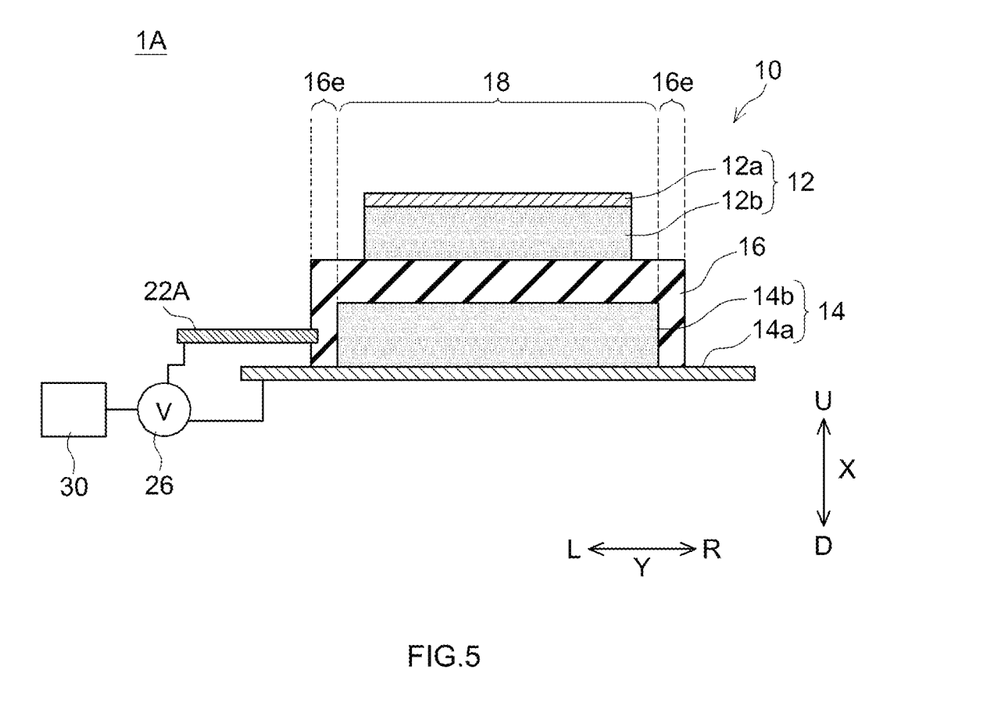
FIG. 5 is a cross-sectional diagram illustrating schematically a sulfide solid-state battery system according to another embodiment.

In the above embodiments, for instance, the reference electrode 22 is fixed to the surface of the negative electrode collector 14a. However, the invention is not limited thereto. FIG. 5 is a cross-sectional diagram illustrating schematically a sulfide solid-state battery system 1A according to another embodiment. The sulfide solid-state battery system 1A is identical to the sulfide solid-state battery system 1 described above, but herein the system has a reference electrode 22A instead of the reference electrode 22. The reference electrode 22A is not fixed to the surface of the negative electrode collector 14a. The reference electrode 22A has no insulating coating. The reference electrode 22A is disposed parallelly to the negative electrode collector 14a, so as not to come into contact with the negative electrode collector 14a. The reference electrode 22A is disposed in a protruding portion 16e at a position, in the stacking direction X, from the surface of the negative electrode collector 14a over a length corresponding to 50% of the average thickness of the negative electrode mix layer 14b. The sulfide solid-state battery system 1A provided with such a reference electrode 22A can be used in the same way as the sulfide solid-state battery system 1.

In the above embodiment, for instance, the sulfide solid-state battery system 1 is provided with the voltage sensor 26 and the detection unit 30, in addition to the sulfide solid-state battery 10, and the detection unit 30 is provided with the measurement unit 32, the storage unit 34, the determination unit 36 and the notification unit 38. However, the invention is not limited thereto. For instance, the voltage sensor 26 and the detection unit 30 may be absent in a case where a technician other than the user measures manually the voltage across the negative electrode collector 14a and the reference electrode 22, at timings such as during periodic inspections. That is, just the sulfide solid-state battery 10 may be present in such a case. For instance, the detection unit 30 of a conductive compound may lack the storage unit 34, the determination unit 36 and the notification unit 38 in the case for instance where the voltage measurement result by the measurement unit 32 is presented as-is to the user in the form of an actually measured value.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A sulfide solid-state battery comprising:
   a negative electrode collector containing copper;
   a negative electrode mix layer disposed on the negative electrode collector, and containing a negative electrode active material;
   a positive electrode mix layer containing a positive electrode active material;
   a sulfide solid electrolyte layer sandwiched between the negative electrode mix layer and the positive electrode mix layer, and having a protruding portion that protrudes from a peripheral edge of the negative electrode mix layer and extends up to the negative electrode collector; and
   a reference electrode disposed in the protruding portion,
   wherein when an average thickness of the negative electrode mix layer in a stacking direction of the positive electrode mix layer and the negative electrode mix layer is 100%, the reference electrode is disposed in the protruding portion within a length range up to 50% of the average thickness of the negative electrode mix layer from a surface of the negative electrode collector.

2. A sulfide solid-state battery comprising:
   a negative electrode collector containing copper;
   a negative electrode mix layer disposed on the negative electrode collector, and containing a negative electrode active material;
   a positive electrode mix layer containing a positive electrode active material;
   a sulfide solid electrolyte layer sandwiched between the negative electrode mix layer and the positive electrode mix layer, and having a protruding portion that protrudes from a peripheral edge of the negative electrode mix layer and extends up to the negative electrode collector, and
   a reference electrode disposed in the protruding portion,
   wherein the reference electrode is fixed to a surface of the negative electrode collector while insulated from the negative electrode collector.

3. A sulfide solid-state battery system comprising:
   the sulfide solid-state battery according to claim 1;
   a voltage sensor electrically connected to the reference electrode and the negative electrode collector, and measuring voltage across the reference electrode and the negative electrode collector; and
   a detection unit electrically connected to the voltage sensor,
   wherein the detection unit is provided with a measurement unit that receives voltage data from the voltage sensor.

4. The sulfide solid-state battery system according to claim 3,
   wherein the detection unit further includes
   a storage unit that stores a threshold value set beforehand;
   a determination unit that compares a voltage value measured by the voltage sensor and the threshold value stored in the storage unit, and determines whether or not the voltage value has reached the threshold value; and
   a notification unit which notifies that the determination unit has determined that the voltage value has reached the threshold value.

* * * * *